Patented June 4, 1940

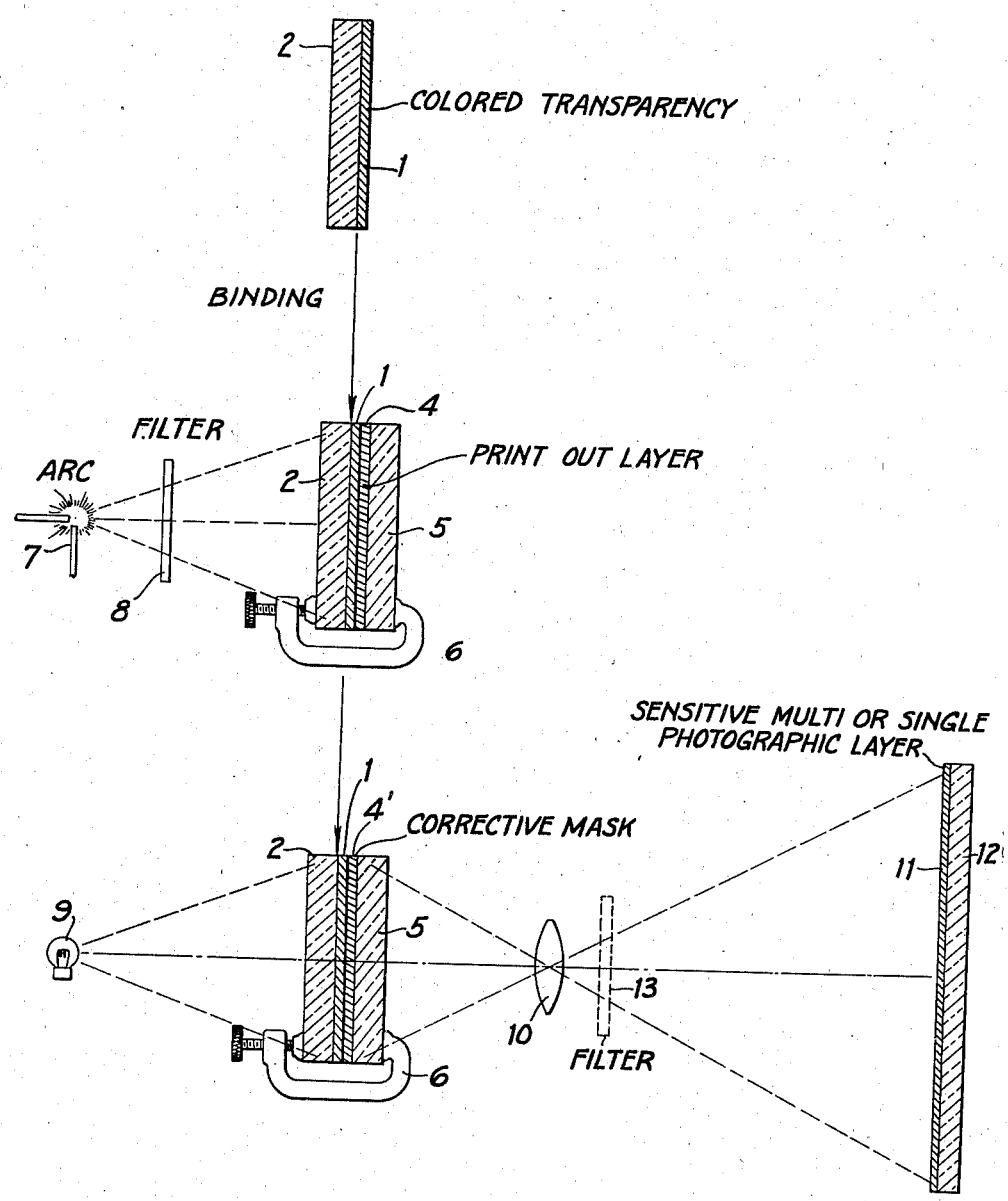

2,203,652

UNITED STATES PATENT OFFICE 2,203,652

COLOR CORRECTION

George Ehrenfried, Rochester, N. Y., assignor to Eastman Kodak Company, Rochester, N. Y., a corporation of New Jersey Application January 6, 1939, Serial No. 249,622

5 Claims. (Cl. 95—2)

This invention relates to color correction in making colored reproductions. It relates particularly to the introduction of color correction when making a duplicate or a color separation negative from a colored transparency.

It is well known that various forms of color correction may be introduced by so-called masking, in which a mask or photographic image corresponding to a so-called correcting color is placed in register with a color separation negative or a multi-color transparency. Ralph M. Evans in a co-pending application Serial Number 139,252, has proposed to make such a mask integral with the film it is to mask. It is also known to use a mask made from a color transparency, which mask is developed to the desired contrast and then placed again in register with the transparency. The latter procedure has the drawback that it is very difficult, if not impossible, to get perfect register between the color transparency and the mask. On the other hand, Evans' procedure is not suitable for use with colored transparencies which have already been prepared and which must be conserved in their original state so that they may be, for example, returned to a customer intact.

It is an object of the present invention to overcome all of these difficulties and to provide a method of masking a color transparency so that correct register is automatically insured, and so that the color transparency itself remains unharmed.

According to my invention, an unexposed print-out layer is placed in contact with the transparency which is to be masked and is then exposed (e. g. to an arc lamp, a vapor lamp, or other brilliant source) through the transparency to form a masking image in register with the transparency. This print-out layer is suitably bound in contact with the transparency and remains in that position until the completion of the process. By suitable choice of print-out layers having known spectral sensitivities and by suitably filtering the exposing light, it is possible to form in the print-out layer a masking image which corresponds to any desired correcting color. For example, if the process is used in making a blue-filter color separation negative, the image in the print-out layer may be made to correspond to a green separation image of the original by exposing to green light only and by having a print-out layer sensitive to such illumination. A sensitive photographic layer, either multi or single, is then exposed in printing relation to the transparency as masked and is then developed in a suitable manner. In this example, green is referred to as a correcting color. My invention is equally applicable to all of the numerous types of masking which have been proposed and is independent of what "correcting" color is used.

According to one embodiment of my invention this last printing exposure is onto a differentially color sensitized multi-layer film, either monopack or bipack, the exposure being to substantially white light. The multi-layer film is then developed in a suitable manner to a multi-colored positive to form a color corrected duplicate of the original transparency.

According to another embodiment of my invention, color separation negatives are made from the transparency as masked, by performing the last exposure through suitable primary color filters successively onto three or more single photographic layers. In this case, the word single is intended to include "built-up" layers such as those having a fast emulsion over a slow emulsion. This embodiment gives color-corrected color separation negatives from which prints may be made in any suitable manner such as by wash-off relief processes.

In still another embodiment of my invention which may be used in connection with either of the above two embodiments but is particularly useful with the first one, a print-out emulsion is selected for the mask which gives a colored rather than a neutral or substantially neutral image when printed out. This latter embodiment is particularly useful for correcting for poor balance between the contrasts of the color separations of the original transparency. I have found that the slight coloration of most print-out emulsions has little or no effect so that the results are the same as with a perfectly neutral mask.

The invention will be more fully understood from the accompanying drawing which shows various steps thereof.

The drawing which is in the form of a flow chart shows a color transparency 1 mounted on a suitable transparent support 2, which may be either glass or film. According to the first step of the invention, this transparency is placed in contact with an unexposed print-out layer 4 mounted on a transparent support 5, which also may be either film or glass. The transparency and the print-out layer are bound together by any suitable means shown as a C-clamp 6. If the transparency and the print-out layer are both on film I prefer to bind them between glass plates, or better still, I prefer to use a print-out layer which is coated on glass and to bind the color transparency between this layer and a clear glass sheet. Obviously, some form of adhesive binding tape is the most practical method of binding the two units, but a C-clamp forms a better illustration.

Furthermore, the necessary and sufficient requirements of this binding are that it must be firm enough to hold the transparency and the print-out layer in the same relative position and must be detachable so that the color transparency may be restored easily to its original form. As an alternative to the bindings discussed above, a water soluble temporary adhesive may be used between the transparency and the print-out layer preferably near the edges only. This is particularly useful when the transparency is a motion picture film. However, as I pointed out, I have found the most practical method for still pictures is to use glass plates bound by adhesive tape.

The print-out layer 4 is then exposed through the color transparency 1 to light from an arc lamp 7 through a suitable filter 8. The sensitivity of the print-out layer and the color of the light transmitted by the filter 8 are such that a print-out image formed in the layer 4 corresponds to some desired correcting color. Which "correcting" color should be used is determined by various factors well known to those skilled in this art and is not specifically part of this invention. For example, if one desires to make a blue separation negative from the transparency, the mask may correspond to green or predetermined relative amounts of green and red from the transparency. If one is making a green separation negative, the mask may correspond to red from the original. For some practical purposes it is possible to make a universal mask suitable for approximate correction of all three color separation negatives.

Such a universal mask or one very similar thereto should be used in duplicating the color transparency onto a multi-layer photographic pack. In such duplicating, as well as in the making of separation negatives, this invention is independent of what color is selected as the "correcting color" for making the universal mask.

As is well known, masking images are usually "thin," i. e. of low contrast. It is, of course, necessary that the contrast be less than unity with respect to the grays in the original so that there will be no reversal of the luminosities. Suitable masks usually have a contrast between .2 and .6, depending on their purpose. Suitable print-out emulsions must be chosen and suitable exposures given to gain this desired contrast.

Obviously this invention will work equally well with any print-out emulsion coated thinly on the support 5 so as to give the desired contrast characteristics. I have found that satisfactory results are obtained with print-out emulsions, such as those described by Fallesen and Staud in their patents, U. S. 2,126,318; U. S. 2,129,207; and U. S. 2,030,860; and especially suitable emulsion is described in the first of these.

Referring again to the drawing, after the image in the print-out layer 4 is printed to form a corrective mask 4', color separation negatives may be made by exposing a single photographic layer 11 on a suitable support 12 through a lens 10 in printing relation with the color transparency 1 as masked by this corrective mask 4'. The transparency is illuminated by a light source 9 shown as a tungsten lamp to illustrate the relative difference in the exposures. This difference is discussed in detail below. When making a red, green, or blue separation negative a red, green, or blue filter is placed as shown by the broken line 13 in the path of the light.

In the embodiment where a differentially color sensitized multi-layer photographic pack is used at 11, which pack is to be developed by suitable color forming developers and which is thus to form a color corrected duplicate of the original transparency, it is preferable to use no filter at the position 13 or to use only a filter which is necessary to correct the color temperature or spectral distribution of the light from the source 9. In the accompanying claims specific to such an embodiment, this is described as exposing a photographic pack to substantially white light from the transparency as masked.

For obvious practical reasons, the forming of the mask in the print-out layer usually requires a large exposure either to an arc lamp or for an extended length of time to a tungsten lamp, whereas the exposure of the photographic pack or color separation negative is usually relatively short. If several sets of color separation negatives or several duplicates are to be made, it is desirable that the latter printing exposures be so short that the masking image is not further affected. Of course if the response curve of the print-out emulsion were perfectly linear, any change in the mask due to the printing exposure would be only in the direction requiring increased exposure and would not act to correct or alter the amount of one color in accordance with the amount of another color present. On the other hand, the actual shape of the characteristic curve of the print-out emulsion would introduce some distortion if the exposure of the color separation negatives or of the photographic packs were sufficient to increase the density of the mask by any appreciable amount.

Some of the terms used in this specification and the accompanying claims will now be defined for the sake of clarity.

The term "binding" is used in its usual sense so as not to include mere placing in contact and also so as not to include permanent adhesive. The term "transparency" refers to the image itself and does not include the support therefor. Thus, in contact with the transparency means that there is no intermediate layer, with the possible exception of a protective coating thereon. Also "transparency" is used in the optical as well as the physical sense and hence has a density and a contrast.

"Print-out layers" are those in which the image is formed by the exposure itself and which do not require further processing. "A correcting color" has a definite meaning, obvious to those skilled in this art and for which several examples are given above. A photographic "pack" may be either a monopack, a bipack, or any of the well-known differentially color-sensitized multi-layer films or plates.

Having thus described my invention and two preferred embodiments thereof, I wish to point out that it is not limited to the specific examples shown, but is of the scope of the appended claims.

What I claim and desire to secure by Letters Patent of the United States is:

1. The method of making a color corrected photographic image from a colored transparency which comprises binding an unexposed print-out layer in contact with the transparency, exposing the print-out layer through the transparency to form a masking image in register with the transparency, the spectral sensitivity of the print-out layer and the color of the exposing light being such that the masking image corresponds to a correcting color, exposing a sensitive photographic layer in printing relation to the transparency as masked and developing this latter layer.

2. The method of making a color corrected duplicate of a colored transparency which comprises binding an unexposed print-out layer in contact with the transparency, exposing the print-out layer through the transparency to form a masking image in register with the transparency, the spectral sensitivity of the print-out layer and the color of the exposing light being such that the masking image corresponds to a correcting color, exposing a differentially color sensitized photographic pack in printing relation to, and to substantially white light from, the transparency as masked and developing the pack to a multi-colored image.

3. The method of making a color corrected color separation negative from a positive colored transparency which comprises binding an unexposed print-out layer in contact with the transparency, exposing the print-out layer through the transparency to form a masking image in register with the transparency, the spectral sensitivity of the print-out layer and the color of the exposing light being such that the masking image corresponds to a correcting color, exposing a sensitive photographic layer in printing relation to, and to a primary color from, the transparency as masked and developing this latter layer.

4. The method of making a color corrected photographic image from a colored film transparency which comprises placing an unexposed print-out layer in contact with the transparency, binding this layer and film together between rigid transparent sheets, exposing the print-out layer through the transparency to form a masking image in register with the transparency, the exposure being such that the masking image is thin relative to the transparency and the spectral sensitivity of the print-out layer and the color of the exposing light being such that the masking image corresponds to a correcting color, exposing with relatively small exposure a photographic layer whose sensitivity is high relative to the print-out layer, in printing relation to the transparency as masked and developing this highly sensitive layer.

5. The combination of a multi colored transparency and a print-out layer bound in contact therewith which layer has been exposed through the transparency to the color which corresponds to a color correcting masking image for the transparency and which layer due to the exposure contains a masking image in register with the transparency and relatively thin with respect to the transparency.

GEORGE EHRENFRIED.